(12) United States Patent
Ordille

(10) Patent No.: US 7,660,830 B2
(45) Date of Patent: Feb. 9, 2010

(54) SYSTEM FOR INTEGRATING DIVERSE DATABASE AND MAINTAINING THEIR CONSISTENCY

(75) Inventor: Joann J Ordille, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1783 days.

(21) Appl. No.: 09/979,197

(22) PCT Filed: Apr. 10, 2001

(86) PCT No.: PCT/US01/12352

§ 371 (c)(1),
(2), (4) Date: Nov. 20, 2001

(87) PCT Pub. No.: WO01/80094

PCT Pub. Date: Oct. 25, 2001

(65) Prior Publication Data

US 2003/0084017 A1    May 1, 2003

Related U.S. Application Data

(60) Provisional application No. 60/197,878, filed on Apr. 17, 2000.

(51) Int. Cl.
*G06F 17/30* (2006.01)
(52) U.S. Cl. .................. 707/201; 707/623
(58) Field of Classification Search .............. 707/1, 707/2, 8, 10, 100, 101, 200, 201
See application file for complete search history.

(56) References Cited

U.S. PATENT DOCUMENTS 4,714,995 A * 12/1987 Materna et al. ............. 707/201
5,561,797 A * 10/1996 Gilles et al. .................. 707/8

(Continued)

FOREIGN PATENT DOCUMENTS

EP    0 877 323 A2    11/1998

OTHER PUBLICATIONS

J. Freire et al., "MetaComm: A Meta-Directory for Telecommunications," Proceedings of IEEE Infocom 2000, pp. 211-219, Mar. 2000.

(Continued)

*Primary Examiner*—Cam-Linh Nguyen
(74) *Attorney, Agent, or Firm*—Ryan, Mason & Lewis, LLP

(57) ABSTRACT

An arrangement maintains consistency among satellite databases and an integrated database that is the union of the satellite databases with a controller that fetches update requests from a queue and applies each fetched request to all of the databases, in sequence, ending with the integrated database. In applying a modification request to a target database, a filter is used that comprises two components. The first component processes the modification request submitted by the queue to a modification request that is appropriate for the schema of the target database and that is based on the data that is already present in the target database. When appropriate, the first component also creates an update request that is sent to the queue, to achieve transitive closure. The second component communicates with the target database, using the API and protocols of the target database.

13 Claims, 2 Drawing Sheets

U.S. PATENT DOCUMENTS

| | | | | |
|---|---|---|---|---|
| 5,634,053 | A | * | 5/1997 | Noble et al. .................... 707/4 |
| 5,778,373 | A | * | 7/1998 | Levy et al. .................. 707/100 |
| 5,806,066 | A | * | 9/1998 | Golshani et al. ............ 707/100 |
| 5,926,816 | A | * | 7/1999 | Bauer et al. .................... 707/8 |
| 5,933,837 | A | * | 8/1999 | Kung ......................... 707/201 |
| 5,970,490 | A | * | 10/1999 | Morgenstern ................ 707/10 |

OTHER PUBLICATIONS

Collier, Roger, "CA Application No. 2,398,426 Office Action Apr. 19, 2005CA", Publisher: CIPO, Published in: CA.

Lafontaine, Eric, "CA Application No. 2,398,426 Office Action Jun. 25, 2008", Publisher: CIPO, Published in: CA.

Van Der Meulen, E.J., "EP Application No. 01 930 534.1 Examination Report Jul. 21, 2009", Publisher: EPO, Published in: EP.

Coby, Frantz, "PCT Application No. PCT/US01/12352 International Preliminary Examination Report Apr. 27, 2006", Publisher: EPO, Published in: PCT.

Metjahic, Safet, "PCT Application No. PCT/US01/12352 International Preliminary Examination Report Jul. 20, 2005", Publisher: EPO, Published in: PCT.

Van Der Meulen, E.J., "PCT Application No. PCT/US 01/12352 International Search Report Nov. 10, 2003", Publisher: EPO, Published in: PCT.

* cited by examiner

SYSTEM FOR INTEGRATING DIVERSE DATABASE AND MAINTAINING THEIR CONSISTENCY

RELATED APPLICATION

This invention claims priority from provisional application No. 60/197,878, which was filed on Apr. 17, 2000.

BACKGROUND OF THE INVENTION

This invention relates to databases, and more particularly to a plurality of databases that are logically combined to form a meta-database, such as a meta-directory.

A great deal of corporate data is buried in network devices, such as PBXs, messaging platforms, email platforms, etc. Typically, each of these devices possesses only the information that is needed for its specialized need, maintains it in a database, and possesses means for administering this information. The means for administering typically must deal either with a proprietary interface, or a standard protocol against a proprietary schema; but typically that presents no problems, as long as one does not want to employ the data in an inter-platform manner. Efforts to use, modify, and update such data in an inter-platform manner, however, leads to many problems, including the need for data replication and difficult interoperation problems with diverse devices and applications.

Nevertheless, the emerging need to provide organization-wide access to data is creating a demand to interconnect previously isolated systems. As a result, integrating information from multiple heterogeneous data sources has become a central issue in modern information systems. A data integration system provides uniform and transparent access to multiple data sources, making information more readily accessible and allowing users to pose queries without having to interact with a specific source, using the proper interface.

Even though an integrated system produces many advantages, as indicated above, difficult problems arise when integrating information from multiple sources; most notably autonomy and heterogeneity. Autonomy relates to the fact that some systems operate under separate and independent control, using their own data model and Application Programming Interface (API). Heterogeneity can arise at different levels. For instance, different systems may use different APIs, different vocabularies, (e.g., use the same term for different concepts or different terms for the same concept) different schemas, etc.

Building custom applications that assemble data from appropriate locations is not always a practical solution. It can be prohibitively expensive, inflexible, and hard to maintain.

Several research projects have developed mediator systems to address these problems. See, for example, G. Wiederhold, "Mediators in the Architecture of Future Information Systems," *IEEE Computer*, pp. 38-49, March 1992. A mediator system provides an intermediate layer between the user and the data sources. Each data source is wrapped by software that translates local terms, values and concepts into global concepts shared by some or all sources, thereby smoothing the semantic heterogeneity among the various integrated sources. The mediator then obtains information from one or more wrapped components, and exports the information to other components. Queries to the mediator are in a uniform language, independent of the distribution of data over sources and the APIs of the source. Another thing that can be said about mediators is that they concentrate on read-only queries. With mediators, queries that are posed against the unified system are dynamically executed at the various data sources, rather than materializing subsets of the data from the various sources in an integrated directory.

In an effort to employ the data that is available on different platforms, a widely deployed directory access protocol has been developed, known as Lightweight Directory Access Protocol, or LDAP. See, for example, S. Cluet et al, "Using LDAP Directory Caches." *Proceedings of PODS,* 1999, and R. Arlein et al "Making LDAP Active With the LTAP Gateway: Case Study in Providing Telecom Integration and Enhanced Services," *Proceedings Workshop on Databases in Telecommunications,* September 1999. To supply all the functionality that users expect, middleware to integrate the LDAP directories with network and telecommunication devices is needed. This integration makes data that has traditionally been buried in network/telecommunication devices like routers, PBXs, and messaging platforms available to new applications that can add value to the data. In addition, since much of this data is replicated in multiple devices, corporate directories, and provisioning systems, integration reduces the need to manually re-enter such data, and consequently, it reduces data inconsistencies across repositories.

From a database perspective, LDAP can be thought of as a very simple query and update protocol. Directory entries are stored hierarchically in a tree fashion, which makes the arrangement easily scalable. Each entry in the tree is identified by a Distinguished Name (DN), which is a path from the root of the tree to the entry itself. The DN is produced by concatenating the Relative Distinguished Name (RDN) of each entry in the path. The RDN for an entry is set at creation time and consists of an attribute name/value pair—or in more complicated cases, a collection of these pairs. The RDN of an entry must be unique among the children (i.e., lower branches) of a particular parent entry in the tree.

One limitation with LDAP is that its update services can only create or delete a single leaf node, or modify a single node; that is, LDAP has the Modify command, and the ModifyRDN command. The Modify command modifies any field of an entry except the RDN field, and ModifyRDN modifies the RDN field. Another limitation is that while individual update commands are atomic, one cannot group several update commands into a transaction. For example, one cannot atomically change a person's name and telephone number if the name is part of the person's RDN but the telephone number is not.

SUMMARY

An improvement in the art is realized with an arrangement that maintains consistency among satellite databases and a materialized database that maintains data that corresponds to the union of data stored in the satellite databases, and is accessible to all users. Consistency is maintained by all modifications (to any and all of the databases that are coupled to the system) being sent to a queue following a conversion to a global database schema; for example the schema of the materialized, integrated, database. Modification requests are fetched from the queue on a first come—first serve basis are applied, seriatim, to each of the different (target) databases that are coupled to the system. In the embodiment illustrated, the integrated database is modified last.

In applying a modification request to a target database, a filter is used that comprises two components. The first component processes the modification request submitted by the queue to a modification request that is appropriate for the schema of the target database and that is based on the data that is already present in the target database. When appropriate, the first component also creates an update request that is sent to the queue, to achieve transitive closure. The processing in the first component is assisted by a specification module that comprises simple declarative statements that define the schema translations, alternative attribute mappings, and pattern matching. The second component communicates with the target database, using the API and protocols of the target database.

DETAILED DESCRIPTION

In accordance with the principles disclosed herein, diverse database sources (satellite systems having satellite databases) are maintained consistent with each other by means of a system that integrates the information of the diverse database sources into a single database, applies appropriate updates to each of the diverse databases to maintain consistency, and allows remote users to access the integrated database.

The databases that are updated by the system disclosed herein provide write-write consistency; that is, the system insures that values for an object attribute that is present in multiple objects (perhaps after an appropriate transformation) eventually converge to the same value after an update. Discussions on write-write consistency are found in an article by A. Deniers et al, titled "Epidemic algorithms for replicated database maintenance," *Proceedings of ACM Symposiun on the Principles of Distributed Computing*, p. 1-12 (1987), and an article by L. Seligman et al "A mediator for approximate consistency: Supporting 'good enough' materialized views," *Journal of Intelligent Information Systems*, 8:203-225 (1997). The system disclosed herein includes techniques to extend this write-write consistency functionality to collections of integrated databases. When applications require the more strict read-write consistency, for example the consistency required when one updates a bank balance with a deposit or withdrawal, the collection of databases will need to use additional distributed transaction techniques. A discussion of read-write consistency can be found in and article by Y. Breitbart et al, "Transaction management in multidatabase systems," in Won Kim, editor, *Modern Database Systems*, pp. 573-591, ACM Press and Addison-Wesley.

Figure 1:
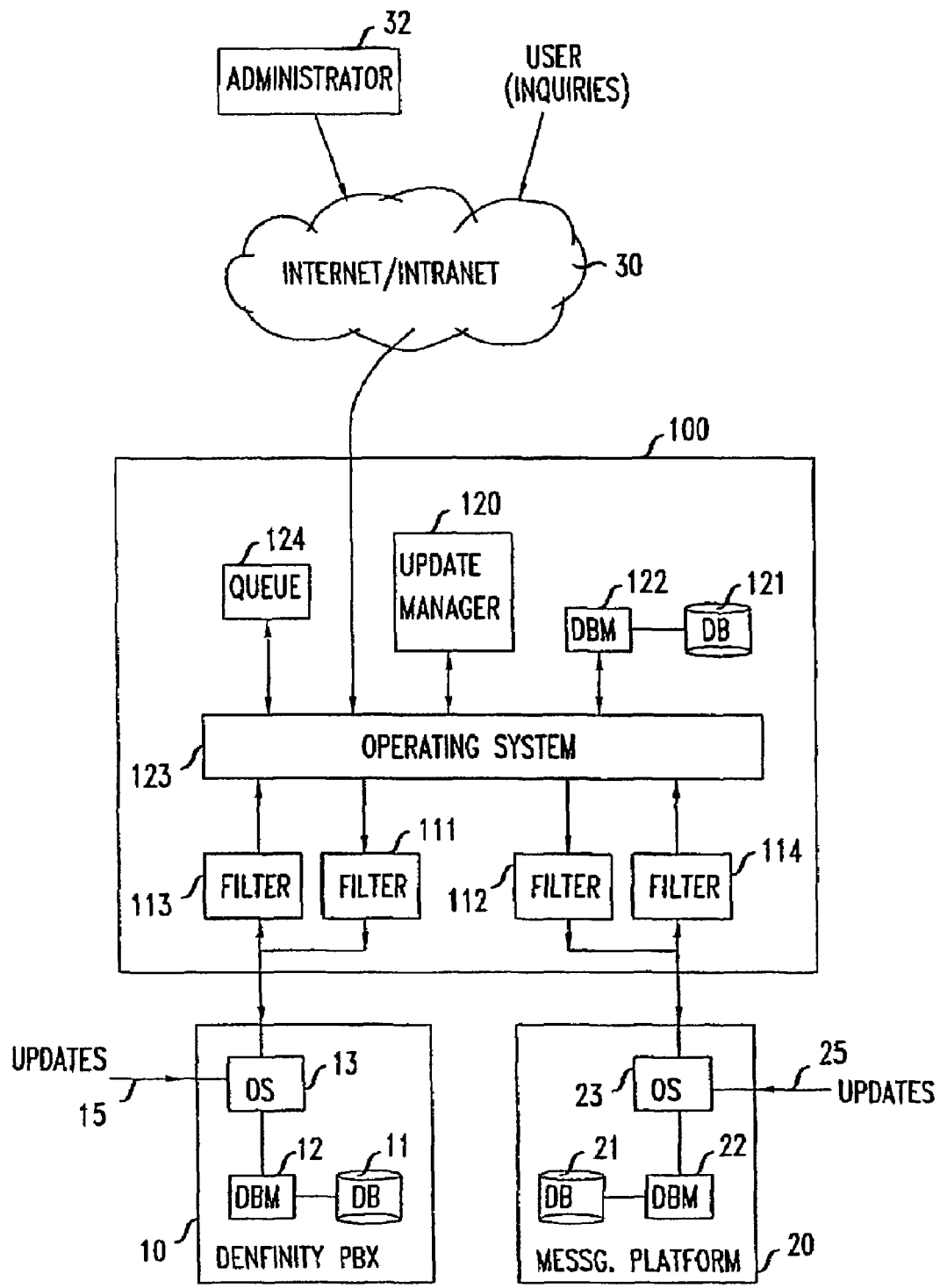
FIG. 1 presents an illustrative example of an arrangement where system 100 is charged with maintaining consistency between the databases of a PBX and a messaging platform, and a materialized database within system 100.

FIG. 1 presents a block diagram of an illustrative system that comports with the principles disclosed herein. It comprises a DEFINITY™ PBX 10 with database 11 (including database manager 12), and messaging platform 20 with database 21 (including database manager 22)—which are the aforementioned diverse databases of the illustrative system. It also comprises a system 100 with database 121 (including database manager 122)—which is the materialized, integrated, database of the illustrative system.

PBX 10

PBX 10 is a conventional PBX with an administrative port 15 and an operating system (OS) 13. Database 11 can be independently updated through port 15, via OS 13 and database manager (DBM) 12. For purposes of this invention, the program in DBM 12 that finally commits updates to database 11 is augmented with a call to a conventional two-way communication module in OS 13. Such augmentation is very simple, and is clearly within the scope of skilled artisans. The communication module is adapted to interact with a preselected port of PBX 100; i.e., the port through which PBX 11 connects to system 100. In the communication direction from system 100 to PBX 10, the communication module is triggered by an interrupt from system 100 and is thereby enabled to receive information from system 100 and to provide responsive information to system 100. This is a conventional communication module and is not explicitly shown in FIG. 1. It acknowledges the receipt of the information and treats the received information as input to its operating system. This includes accepting input from system 100 that is directed to DBM 12. The input may comprise a query of database 11, or an update of database 11 (which includes adding to, deleting from the database). In the communication direction from PBX 10 to system 100; that is, when an update is introduced into database 11 from path 15, the communication module is adapted to trigger execution of a program module within system 100 and to interact with that program module, for example, passing information from DBM 12. That program module is represented in FIG. 1 by filter 113.

Platform 20

Platform 20 is a conventional messaging platform that includes an operating system (OS) 23, and port 25 through which an administrator can update database 21. In the FIG. 1 embodiment, OS 23 includes a communication module that is identical to the one described in connection with PBX 11 and, also like in connection with PBX 11, database manager (DBM) 23 is augmented to request its communication module to trigger filter 114 in system 100 whenever an update to database 21 is being committed.

System 100

In addition to database 121 and associated database manager 122, system 100 includes an update manager (UM) 120, a queue 124, and an operating system 123 that allows communication between UM 120, DBM 122, and queue 124, as well as communication with filters 111-114. The function of UM 120 is to update database 121 as well as all of the external databases (e.g., database 11 and database 21) in response to each request that is stored in queue 124. The update from system 100 to database 11 in PBX 10 is via filter 111, and the update from system 100 to database 21 in platform 20 is via filter 112. System 100 typically includes its own administration path; for example, administrator 32 that is connected to OS 123 through Internet 30. Update requests arriving from administrator 32 are placed in queue 124 just like update requests from database 11 of PBX 10 (via filter 113) and from database 21 of platform 20 (via filter 114). As an aside, system 100 is typically realized in a stored-program controlled computer that includes a processor and memory that includes the operating system, the update manager, the queue the database manager and the database itself.

Database Modifications

Database modification requests are handled by queue 124 on a First-In-First-Out (FIFO) basis, and can be structured in various ways. Illustratively, each request is a string (e.g., terminated by the "lie feed" character <LF>) that specifies the source of the request and information about the data modification that is sought to be effected. The specification of the source is not a requirement of this invention, but typically one would want to have the source specified (if the source of the update request is other than administrator 32) so that updating of the source can be skipped during the updating process.

To illustrate the principles disclosed herein, the discussion that follows employs a database 11 that comprises two database tables, and a database 21 that comprises one table. The illustrative database base arrangement are relational, but it should be noted that the principles disclosed herein are not dependent on the database being relational and that, for example, the databases can be hierarchical. In particular, LDAP provides a hierarchical database that can be modeled as relational by treating each LDAP object class as a separate relation that also includes the distinguished name of the object. Specifically, the illustrative database 11 tables are

| db 11 table "people" | | db 11 table "communication" | |
|---|---|---|---|
| ☞ SS | Social Security # | ☞ ID | Record ID |
| cn | common name | SSN | Social Security # |
| mn | Middle name | ph | Phone number |
| sn | Surname | typ | type |
| org | Organization # | | | and the illustrative database 21 table is

| db 21 table "subscribers" | |
|---|---|
| ☞ ID | Record ID |
| SOC | Social Security # |
| lgn | Login name |
| sn | Subscriber name |
| al | Alert options |
| msg | # stored messages |

The ☞ symbol indicates that the field is a primary key field (or key field, for short). Key fields are fields through which the database manager insures uniqueness of records. This is enforced by the database manager refusing to accept new records, or changes to records, which have a value that is already present in the database. In some tables, a field exists that can naturally serve the function of the key, and the database designer can choose that field as the key field. See, for example, the SS field in the "people" table of database 11. In some tables, a field exists that can naturally serve the function of the key but the designer does not choose that field as the key field, allowing the database to effectively create a dummy field whose sole purpose is to insure uniqueness of records. An example of that is found in the "subscribers" table of database 21, where a Record ID field is included and serves the function of the key field, even though the (lgn) field could have served as the key field. In still other tables, no field exists that can naturally serve the function of the key. In such cases, the database manager adds a key field; such as the Record ID field in the "communications" table of database 11.

Before proceeding with the discussion of database modifications, a few observations about the tables of databases 11 and 21 are in order. The "people" table records identify people in an organization. The "communication" table records identify phone numbers that can be used to reach people. Each record in the "communication" table is related to one record in the "people" table, and each record in the "people" table is related to zero, one, or more records in the "communication" tables. The fields that establish this relationship are the (SS) and (SSN) fields in the "people" and "communication" tables, respectively. To illustrate, Mary Jones with Social Security Number 123-45-6789 may have one record in the "people" table and two records in the "communication" table: one with ph=(908) 420-1234 and typ=voice, and another record with ph=(908) 420-5609 and typ=fax.

The records in table "subscribers" contain information about stored messages that are destined to a particular login name and that are associated with a particular person. A person is associated with each login name, and the persons identified in the subscriber table of database 21 may be the same persons that are specified in the "people" table of database 11, i.e., persons who have the same social security number, in a field named "SOC." Also, a person can have a number of logins.

In addition to semantic difference between the tables, in that the same data are present in differently named fields in the different tables, and different data is present in similarly named fields, for example the (sn) field in the "people" and "subscribers" tables, there is also a structural difference between the tables. For example, the information contained in field (sn) of the "subscribers" table in database 21 corresponds to a subscriber's full name, such as "Harry Samuel Jones, Jr.," whereas a record in the "people" table of database 11 that corresponds to the same person contains the same information—namely, the person's full name—but only through the concatenation of three separate fields; to wit, the (fn), (mn), and (sn) fields.

Thus, there is a need to maintain consistency between databases 11 and 21, and as indicated above, the ultimate aim of system 100 is to maintain this consistency, and to have the union of all data available to users. In the course of this undertaking, system 100 materializes and maintains database 121. With reference to the above-presented illustrative databases 11 and 21, database 121 may be structured to have the following tables and relationships:

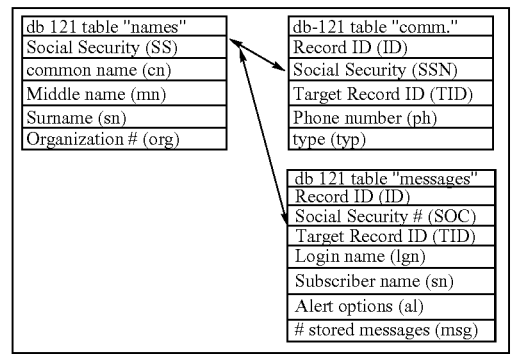

The "comm" table of database 121 is essentially identical to the "communication" table of database 11, and the "messages" table of database 121 is essentially identical to the "subscribers" table of database 21 (though both include a Record ID that is not included in the "communication" and "subscribers" tables), and the "names" table is identical to the "people" table. Note that an alternate representation of the information in database 11 and database 21 within system 100 would eliminate redundant fields, such as messages.sn, which can be constructed from the "names" tables. Moreover, database 121 might also include information that its not found in either database 11 or database 21.

Returning to the subject of database modifications, an update in database 21 (e.g., by operation of its administrator at port 25) might be a string such as

Example 1

Update;
Updatekey subscribers.SOC=296-32-0735;
subscribers.lgn=smiller, subscribers.sn=Susan Miller; <LE>.

What this string specifies is that
(a) an update of a record has taken place,
(b) a "subscribers" table includes a field labeled "SOC",
(c) the record with the (SOC) field value of 296-32-0735 was updated,
(d) the value of an (lgn) field of that record was updated to smiller, and
(e) the value of an (sn) field in that record was updated to Susan Miller.

By the time this request passes through filter 114 and is stored in queue 124 it is of the form:

Example 2

Update;
source=DB_21;
Updatekey messages.SOC=296-32-0735;
messages.lgn=smiller; messages.sn=Susan Miller;<LF>.

What this string specifies is that the source is database 21, and that a record in the "messages" table where the (SOC) field is equal to 296-32-0735 is to be updated so that the value of the (lgn) field is changed to smiller and the value of the (sn) field is changed to Susan Miller. The transformation used to create this update (example 2) from the update to database 21 (example 1) is a very simple one, based on attribute equivalence. A more complicated transformation from database 21 to database 121 might set name.cn, name.mn and name.sn appropriately from messages.sn. A merit of the system disclosed herein is that even though this relationship is only described implicitly through other attribute mappings, notable the ones between database 21 to database 121, described below, the transitive closure techniques eventually cause the attributes in database 121 to change appropriately.

An update request that is triggered by an add in database 21 might be a string such as:

Example 3

Add;
Source=DB_21;
messages.SOC=296-32-0735, messages.lgn=smiller, messages.sn=Susan A. Miller, messages.al=cal: 2035823451, messages.msg=0,<LF>.

Lastly, an update request that is triggered by delete in database 21 might be a string such as:

Example 4

Delete;
Source=DB_21;
Updatekey messages.SOC-296-32-0735;<LF>.

Figure 2:
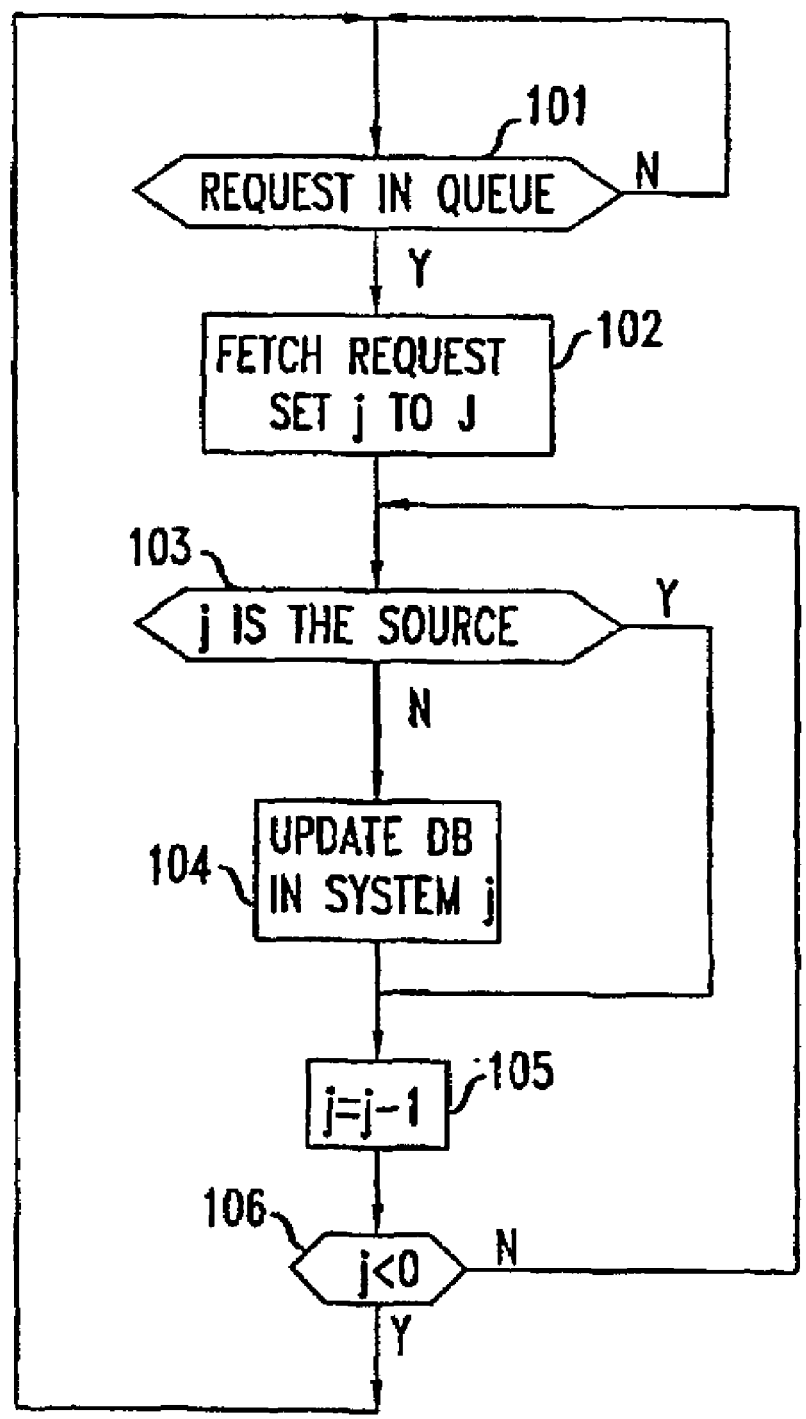
FIG. 2 illustrates a flowchart of the process carried out by update manager 120 in FIG. 1.

As indicated above, UM 120 carries out the updates specified by entries in queue 124 that arrive from filter 113, filter 114, administrator 32, and/or possibly from DBM 122. The latter might occur when OS 123/DBM 122 self-triggers an update in database 121 (for example, through action of the cron in a UNIX™-based system). FIG. 2 presents a flow chart of the update sequencing process carried out in UM 120.

Step 101 determines whether queue 124 is empty. If it is not, step 102 fetches the next request in queue 124 and erases the request from the queue, sets index j to J, and passes control to step 103. The value of J corresponds to the number of external databases with which system 100 concerns itself, and in the illustrative example of FIG. 1, J=2, (with, for example, database 11 corresponding to j=1 and database 21 corresponding to j=2). The database within system 100 (i.e., database 121) always corresponds to j=0.

Step 103 performs the appropriate modification to database j and passes control to step 104 where the index j is decremented, and the latter passes control to step 105. Pursuant to step 105, as long as j is not less than 0, control returns to step 103 to update the next database. When j=0 database 121 is updated. When j is less than 0, control passes to step 101 to initiate a database modification in response to a next update request in queue 124.

The Filters

The updating carried out in step 104 comprises a call to the filter that is appropriate for the database that is being updated. Specifically, filter 111 is called when updating database 11, and filter 112 is called when updating database 21. Each filter is simply a call to a TranslateUpdate Function followed by a call to CommunicateUpdate Function. The TranslateUpdate Functions of different filters vary in the details, but structurally they are the same. Similarly the CommunicatetUpdate Functions of different filters vary in the details, but structurally they are the same. Filter 111, for example, is simply:

OutboundFilter (111, portID, InUpdate, OutUpdate)
{
TranslateUpdate (111, InUpdate, effUpdate, OutUpdate, RC)
CommunicateUpdate (111, PortID, effUpdate, RC)
}

The PortID parameter identifies the port that is used to communicate with the target system, the InUpdate parameter is the update request structure/string that is fetched from queue 124, and the OutUpdate parameter is an update request string that is sent to queue 124 in consequence of information gained from the process of updating the databases based on the update request of the InUpdate parameter (i.e., complying with transitive closure requirements). Internal to the filter, the effUpdate parameter of TranslateUpdate_111 is the output structure/string of the TranslateUpdate_111 Function. It is the update information, developed in response to the InUpdate string and translated to the schema of database 11, which system 100 wishes to impart to database 11. The TranslateUpdate Function is thus the module that overcomes the structural and semantic differences between the source and the target of the filter. The RC parameter is a Return Code, indicating whether an update message should, in fact, be sent to PBX 10, or whether an error indicates that an update of database 11 should not take place. The CommunicateUpdate Function communicates the effUpdate information to the PBX10 via the PortID, using the API and protocols specific to PBX10. The CommunicateUpdate Function is thus the module that overcomes the communication protocol differences between the filter's source and the target systems, and interacts with the target system to actually implement the requested database modification. It may be noted that the same CommunicationUpdate module may be used in more than one filter, for example if system 100 were interacting with another DEFINITY PBX satellite system. That is, the CommunicationUpdate module is target-centric. For example, satellite systems that employ different communication APIs require a CommunicationUpdate module that is different in its particulars.

As indicated above, the task of each TranslateUpdate Function is to overcome the structural and semantic differences between a specific source and a specific target. It accepts a structure/string that specifies the action to be done (InUpdate), and outputs a translated structure/string (effUpdate) that is aimed at the target database, and a return code (RC). In addition, it outputs an OutUpdate string that is returned, illustratively to queue 124, to update the databases in conformance with transitive closure. In accordance with the principles disclosed herein, the TranslateUpdate Function comprises three sections of simple declarative specification sections, and a processing section. The following illustrates the three specification sections for the TranslateUpdate_111 Function of the database 121 that is illustrated above.

0735 contains the information cn=Susan, mn=Ann and sn=Jones, it would make sense to convert the add request to an update request to change the (sn) field from Jones to Miller, and it would even make sense to send back to system 100 a update request modify Susan Miller to Susan Ann Miller.

To refrain from doing the inadvisable, and to do the advisable instead, the TargetJoin subsection specifies the fields that uniquely identify the record that is sought to be inserted. That is, fields specified in the TargetJoin subsection identify the key fields in the target database that are used when an add request is attempted to insure that it should not be converted to an update request. In the illustrated TranslateUpdate_111 Function, those fields are the people.SS field for updates to the "people" table, and comnmunication.SSN field for updates to the "cornmunication" table.

|  |  | Section I |
|---|---|---|
| Source | name=DB_121; | # Specifies that database 121 is the source |
| SourceObjects | names.SS, | # Potentially relevant fields of the "names" |
|  | names.cn, | table; |
|  | names.mn, |  |
|  | names.sn, |  |
|  | names.org, |  |
|  | comm.SSN, | # Potentially relevant fields of the "comm" |
|  | comm.ID, | table; |
|  | comm.ph, |  |
|  | comm.typ, |  |
|  | messages.SOC, | # Potentially relevant fields of the |
|  | messages.sn, | "messages" table; |
| Target | name=DB_11; |  |
| TargetObjects | people.SS, |  |
|  | people.cn, |  |
|  | people.mn, |  |
|  | people.sn, |  |
|  | people.org, |  |
|  | communication.SSN, |  |
|  | conununication.ID |  |
|  | communication.ph, |  |
|  | communication.typ; |  |
| TargetJoin | people.SS, | # Reference fields-used in "add"s; |
|  | communication.SSN; |  |
| TargetUpdate | people.SS, | # Reference fields-used in "update"s; |
|  | communication.ID; |  |

This section identifies database 121 as the source, specifies the fields (objects) found in the tables of database 121, identifies database 11 as the target database, and specifies the fields (objects) found in the tables of database 11. It is noted that in specifying the source objects, objects that cannot contribute information to the target database are not included; for example, the (messages.al) object. Correspondingly, target fields that cannot be generated from information from the source are also not included.

The TargetJoin subsection is used in "add"-type modifications to insure that update requests that are structured in the form of an "add," add a record to database 11 only if necessary. For example, the earlier illustrated add request (Example 3), it would not make good sense to add a record to the tables of database 11 if appropriate records already exist in the tables of database 11 for an individual with a social security number of 296-32-0735. Indeed, the database manager of database 11 would not allow it. However, it makes good sense to make sure that the attributes of the individual in database 11 whose social security number is 296-32-0735 are consistent with the attributes found in the add request. For example, if the record in the "names" table with SS=296-32-

Thus specifically, in response to an add specification in the InUpdate string, the TranslateUpdate Function ought to perform a query on database 11, such as

| SELECT | names.*, communication.* |
|---|---|
| FROM | names, communication |
| WHERE | names.SS=messages.SOC and communication.SSN= messages.SOC, | analyze the query results, and determine how the "names" and "communication" tables of database 11 need to be updated, if at all. The * symbol in a query designates all fields. In the illustrated case, for example, the "names" table needs to be updated (because the query would reveal the fact that the surname Jones does not match surname Miller—which is surname stripped off from Susan Miller), but the "communication" table does not need to be updated.

Alternatively, the query can be performed on corresponding tables and fields in database 121, as described in more detail below.

The TargetUpdate subsection specifies the target fields that uniquely identify records in the target database that are used for updates to the target tables. That is, as with add requests, update requests ought be performed intelligently, which means that a field should not be updated if the update would result in no change. Accordingly, a query is performed by the TranslateUpdate Function, effectively as described above, the query results are analyzed, and an update request is constructed accordingly. Thus, the TargetUpdate subsection specifies the key fields for update requests and, in the illustrated example, those fields are the people.SS field for updates to the "people" table, and communication.ID field for updates to the "communication" table.

Similarly, there may be a TargetDelete subsection in some embodiments of the invention. The TargetDelete subsection specifies the target fields that uniquely identify records in the target database that are to be deleted. In this embodiment, the TargetDelete fields are always the same as the TargetUpdate fields, so only the TargeUpdate fields are specified.

The second section of the TranslateUpdate_111 Function of the above-illustrated database 121 may be of the form:

---

Section II

| Constraint | sn "^[A-Z][a-z]*", org "[0-9][0-9][0-9]" | # imposed constraints; |
|---|---|---|

---

Where the * symbol in a string means 0 or more repetitions of the immediately previous character. This section specifies whatever constraints are sought to be imposed on data that is entered into the target database. If the constraints are not met, a Return Code indicative of an error is generated. Otherwise, a "successful execution" Return Code is generated The listing above illustrates two constraints; that being that the surname must begin with a capital letter followed by at least one lower case letter, and the organization has precisely three digits. Generally, there may be many more constraints. In particular, the constraints may be used to accept or exclude otherwise valid data based on the distribution scheme of the data (illustrated below in the discussion of storing phone number information in different databases depending on the area code and exchange in the number).

The third section of the TranslateUpdate_111 Function of the above-illustrated database 121 may be of the form:

---

Section III

| people.SS=names.SS, <br> people.SS=comm.SSN; <br> people.SS=messages.SOC | # single, or alternative, <br> definitions for objects in the <br> names table of database 11; |
|---|---|
| people.cn=names.cn, <br> people.cn=stripoff_cn(messages.sn); <br> people.mn=names.mn, <br> people.mn=stripoff_mn(messages.sn); <br> people.sn=names.sn, <br> people.sn=stripoff_sn(messages.sn); <br> people.org=names.org; | |
| communication.SS=names.SS, <br> communication.SS=comm.SSN; <br> communcation.SS=messages.SOC <br> communication.ph =comm.ph; <br> communication.typ=comm.typ; <br> communication.ID=comm.ID; <br> } | # single, or alternative, <br> definitions for objects in the <br> communication table of database <br> 11; |

---

This section specifies the correspondences that are enforced in placing data in the target database; i.e., this section produces the information that forms the effUpdate structure/string. In addition to forming the effUpdate structure/string, it provides for multiple mappings as a sequence of alternate mappings. The first mapping in the sequence is executed if the required source attribute is present. Otherwise, the next mapping in the sequence is executed, etc. Of course, if the source attribute is not present for any of the alternative mappings, no mapping is effected at all. In the case of the first entry, for example, it states that if names.SS attribute is present in the InputString, then the people.SS field for database 11 is made equal to the provided names.SS attribute. If the names.SS attribute in database 121 is not present but the comm.SSN attribute is present, then the people.SS field for database 11 is made equal to the comm.SSN attribute. Lastly, if neither the names.SS attribute nor the comm.SS attribute are present but the messages.SOC field is present, then the people.SS field of database 11 is made equal to the messages.SOC attribute. It is noted that pattern the stripoff_cn function, as well as other functions, can include various conventional constructs, such as pattern matching. With the aid of pattern matching, for example, the components of a person's name can be properly parsed out regardless of whether "John Adams Quincy, Jr.," or "Quicy Jr., John Adams" is presented. For example, the following pattern properly locates a person's first name:

---

Pattern fname(strg)=
{
",", part(part(strg,2,2,","),1,1,"\t\t"),
".", part(strg,1,1,"\t\n")
};

---

The pattern, called fname, accepts the full name, strg, as an argument. The pattern includes two columns and two rows. It matches strgagainst the regular expression in the first column in sequence. The first matching regular expression causes the mapping in the second column to be executed. In this example, the mappings use the function "part": part(strg,a,b, c).

The function "part" breaks the input string strg into parts separated by one or more of the delimiter characters in c. In the above examples, the delimiters are either a signal comma or from the set including a blank, a tab, and a new line. Counting from 1, "part" returns parts a through b (with enclosed delimited characters present).

In the pattern fname, the first row matches names that include a comma, and the associated mapping returns the first word after the comma as the first name. If the regular expression in the first row does not match, the regular expression in the second row matches any non-null string. The associated mapping returns the first word of strg as the fist name. If neither regular expression matches, the original string (in this case, null) is returned.

Also, with pattern matching, bulk updates are possible; for example, change the people.org field to "Avaya 12" in all records where the people.org field is "Lucent 45*" (where the * is a "wildcard" that stands for any one or more characters). Lastly, string operations are permissible in the specification section m. For example, the third section of the TranslateUpdate_112 Function (where the database 21 is the target database) includes the entry subscribers.sn=names.cn+" "+names.mn+" "+names.sn.

In the declarative specification, the first section describes the source and target attributes that may be involved in the modification of the target. The source attributes are used in the correspondences in Section III to generate target attributes that are added, modified, deleted, used as keys, or used in constraints. Since some attributes that can be generated by the correspondences may not be permitted in add or modify requests, at the target, or must not be deleted from the target database, it is useful to note this in the TargetObjects section. Such attributes are preceded by a "noadd," "noupdate," and/or "nodelete" qualifier. If the communication.ID for database 11 is generated by the target as a unique key and cannot be changes but can be deleted with the record, it would be represented in the following way in TargetObjects:

noadd nodelete communication.ID

When some attributes in a target are listed as "nodelete," a delete request for the target replaces all attributes that can be deleted with nulls and leaves the "nodelete" attributes unchanged. In the global, materialized, database (database 121) this has the effect of allowing information specific to one of the integrated database to be deleted while still maintaining information required by the other integrated databases When all the attributes in the global database record become null, the global database can remove the record.

The processor section creates the effUpdate structure/string, and the Return Code. Employing queries that address database 121 rather than the target databases themselves, the processing section of the TranslateUpate Function may have the form:

TranslateUpate (filterID, InUpdate, effUpdate, OutUpdate, RC)
{
Get source from InUpdate.
Read SourceMap of file identified by filterID.
Get Target objects that are required as keys or that can be affected by update.
Get first correspondence to objects for DB_121 that uses the changed or target key fields.
Identify involved DB_121 tables.
Construct and execute Query on involved tables for target information.
Compare what is in target to what the update calls for.
Construct add/update request on the target tables, and the OutUpdate string.
}

To illustrate, say the InUpdate string is the Example 2 illustrated above, i.e.,
Update;
source=DB_21;
Updatekey messages.SOC=296-32-0735;
messages.lgn=smiller, messages.sn=Susan Miller;<LF>.

In such a case, the TranslateUpdate Function does the following:
TranslateUpate (111, "Update; source=DB_21; Updatekey messages.SOC=296-32-0735; messages.lgn=smiller, messages.sn=Susan Miller", effUpdate, RC)
☞ Get source from InUpdate
source=DB_21
☞ Read SourceMap of file identified by filterID; i.e., read the above-illustrated first specification Section
☞ Get Target objects that are required as keys or that can be affected by update. The first update is messages.lgn=smiller. Searching through the TargetObjects portion of the Section III specification of file identified by filterID (in the instant example, the above-illustrated Section III specification) reveals that there are no messages.lgn entries and, therefore, the conclusion is reached that the messages.lgn update has a null effect. The second update is messages.sn=Susan Miller. Searching through Section III specification reveals that the "people" table is affected and, in particular that the messages.sn update can affect people.cn, people.mn, and people.sn. From the TargetUpdate portion of Section I specification, the key field people.SS is also identified.
☞ Get first correspondence to objects for DB_121 that uses the changed fields. Based on Section III specification, one gets:

| changed field | first correspondence |
|---|---|
| people.SS | names.SS |
| people.cn | names.cn |
| people.mn | names.mn |
| people.sn | names.sn |

☞ Identify involved DB_121 tables.
names
☞ Construct and execute Query on involved tables for target information.
SELECTnames.cn, names.cn, names.sn
FROM names
WHERE names.SS=messages.SOC
☞ Compare what is in target to what the update calls for. Through the "stripoff" it is determined that the target fields need to be updated as follow:
people.cn field should contain "Susan,"
people.mn field should be null, and
people.sn should be updated to "Miller."
That may be modified, however, to take the approach that an update to a null really corresponds to a no update at all, in which case the comparison to be made is whether the results of the query yield names.cn=Susan, and people.sn=Miller. a null value. Carrying out the comparisons in the illustrative example, this step identifies that the update should change the surname of the individual with people.SS=296-32-0735 from "Jones" to "Miller." Additionally, the comparison step reveals that the update to the "messages" table suggests that the people.mn should be empty, but the query shows that people.mn is set to "Ann." This suggests that the messages.sn field should be updated from Susan Miller to Susan Ann Miller and the name.sn field should be updated to Miller. The changes to these fields are identified by using the declarative specification for filter 114; that is, the specification for translating the data in reveres, from an update on database 21 to an update on database 121 (see the later discussion on inbound filters).
☞ Construct add/update request on the target tables
effUpdate=Update; Updatekeypeople.SS=296-32-0735;
people.sn=Miller;<LF>.
☞ Construct the OutUpdate
OutUpdate=Update; Updalekey messages.SOC=296-32-0735;
messages.sn=Suisan Ann Miller;<L>.

In the above illustration of TranslateUpate for filter 111 the constraints of the second specification section are met. When a constraint is not met, the processing section of the TranslateUpdate Function chooses one of a number of options, based on the specific encountered situations. For example, if the update request illustrated above wished to set messages.sn-Susan Miller3, the constraints of the second specification section would not be met, the RC parameter would be set to its "error" value, for example, binary 1, the effUpdate string would not be created, the OutUpdate string would not be created, and the CommunicateUpdate Function would not be executed.

The above illustrative example demonstrates a situation where an add request is converted to an update request. Other database modification changes can also occur, for example, where an update request changes to a delete request vis-à-vis one database, and to an add request vis-à-vis another database. Consider, for example, the situation where a first database contains records for individuals with assigned telephone numbers from exchange (908)-582, e.g., all individuals working company A in state X, a second database contains records for individuals with assigned telephone numbers from exchange (973)-386, e.g., all individuals working for company B in state X, and a third database contains records of all individuals with telephones in state X. Consider further that an individual with telephone number (973)-386-1234 changes jobs and is given the telephone number (908)582-1234, and that this modification in the telephone number of the individual is effected in the third database. Such a modification would be in the form of an update in the third database, which triggers an update request that is sent to queue 124. In executing the update request on the first database attempting to update from (973)-386-1234 to (908)-582-1234, the record (973)-386-1234 is not found, but it is known from the second specification section that this database only entertains phone numbers in the format (908)-582. Since the update matches this constraint, but a record to be modified in not found, the update request is converted to an add request. In executing the update request on the second database, on the other hand, a record is found, but the constraint of the second specification section disallows changes other than to numbers that begin with (973)-386. Since the individual's number does not begin with (973)-386, the record of that individual must be removed from the second database and, therefore, the update request is converted to a delete request.

In our examples, records in the target database are read and compared to incoming request before being updated. Reading target records that match the TargetJoin key fields on an add is necessary to permit combining existing data with additional data from new sources. The filter may optionally raise an error to indicate that the databases are out of synchronization if an add request attempts to change preexisting data (rather than modify it). If the source field in the add request is identical to the target, then raising an error is not appropriate because the add is being re-executed to ensure consistency across all of the databases (as explained further below). In such a case, the add request is always converted to an update request.

When an update request is made, the constraints can often be used to avoid the cost of the read at the target. This is useful, because the targets integrated into the global database may need to avoid unnecessary operations due to performance limitations or requirements. The previously described algorithms for creating target attributes from the source attributes are used to create values for constrain attributes that may already exist in the target (ore old attributes) as well as their values at the target after any modification (the new attributes). The following rules for changing an update request to some other modification request can be used:

| Old Attributes | New Attributes | Resulting Operation |
|---|---|---|
| violate constraints | satisfy constraints | add request |
| satisfy constraints | satisfy constraints | remains a modify request |
| satisfy constraints | violate constraints | delete request |
| violate constraints | violate constraints | no operation at the target. |

If the resulting operation fails at the target, it may indicate that the source and target databases are no longer synchronized. When a delete request is made, it is not necessary to read the target database unless the target delete key needs to be found.

As indicated above, the OutUpdate string provides a mechanism for sending back to queue 124 modification requests that, in conformance with transitive closure, are found to be needed though the process of preparing a modification request for the target database. At times, the same mechanism must take place, but after a modification is effected in the target database. Consider, for example, that an individual's surname is modified in the "names" table of database 11, and that an update request is sent to queue 124, which later is converted to an update request for the "subscribers" table of database 21. Consider further that database 21 develops the Login name of individuals algorithmically, and that, consequently, an individual name Susan Ann Jones would have the Login name sajones. When the names of Susan Ann Jones is updated to Susan Ann Miller (e.g., following a marriage), database 21 automatically changes the Login name from sajones to samiller (assuming that samiller is unique). To satisfy transitive closure, database 21 needs to create and send an update request to queue 124 to reflect the change from sajones to samiller. A similar situation occurs when an update request that is applied to a particular target database is converted to an add request, and the table where the record is added creates its own Record ID (or some other object). An update request must be created and sent to queue 124 to impart to system 100 the created Record ID (or some other object) information.

To generalize the above, a simple algorithm for achieving transitive closure between a source-target pair with mappings in both directions effectively follows the following:
  Loop until no changes occur to the target or source attributes
    For any target attribute that has not been set to a new value and for which there are some source attributes with new values that can create a new value for the target attribute, create a new value for the target attribute;
    For any source attribute that has not been set to a new value and for which there are some target attributes with new values that can create a new value for the source attribute, create a new value for the source attribute;
  End Loop An extension of this algorithm to one that deals with a source that updates multiple targets merely executes the above algorithm for each source-target pair until no changes occur to any source or target attributes for a full iteration of the loop. This new algorithm is executed before any updates are applied to any target. Because this algorithm modifies only attributes that have not been set to a new value, the algorithm will terminate. When the updates are applied, sending a new update request to queue 124 for the generated attribute can process any new attributes that are generated by the target database, as previously described.

An optimization of these algorithms is possible for data generated by a target database other than the global database. If the generated target attributes do not affect any attributes except those in the global database, the newly generated attributes can be mapped to the affected attributes in the global database and added to the current update request. Since the global database is always updated last, information about the generated attributes can be recorded in the global database without sending a new update request to queue 124. Typically when unique keys are generated by target database, only the global database needs the record them for use in future update operations. Likewise, if the global database generates data that is not used elsewhere, it does not need to send a new update request to queue 124.

It may be noted that the update request that is communicated to queue 124 and that is propagated identifies the source database. Yet, the sequencing described above, and depicted in FIG. 2 does not treat the source database any differently than any other database. The need for the sequencing to treat the source database in the same manner as non-source databases is made clear by considering a situation where a first database sends an update request to queue 124 to modify attribute A to B, and a short time later a second database sends an update request to queue 124 to modify the same attribute from A to C. By not ignoring the information as to which database is the source of the modification requests, the first update request results in both databases assigning the value B to the attribute, and the second update request results in both databases assigning the value C to the attribute. If update requests skipped the source database, the first update request would result in the second database assigning the value B to the attribute, and the second update request result would result in the first database assigning the value C to the attribute. That would make the databases inconsistent.

Theoretically, there is a possibility of an endless modification loop. An update to table a parameter X in A may cause an update to a parameter Y in table B, which may cause an update to the same parameter X in table A, ad infinitum. While this is highly unlikely, one can protect against the endless loop by adding a repetition flag to each update that is sent to queue 124. Updates that originate in a database and are sent to queue 124 carry the value 0 for the repetition flag. An update that results from a modification triggered from system 100 is sent back with a repetition flag that is incremented by 1. Setting a threshold at some selected arbitrary value (for example, in the second specification section—such as RepetitionFlag<4) permits breaking the endless loop.

The above description coveres the outbound filters, such as filter 111, and the inbound filters are quite similar. For example, a satellite database triggers execution of an inbound filter (such as database 11 triggering execution of filter 113), and that filter comprises a call to a source-centric communicateUpdate module, followed by a TranslateInUpdate function. For example, OutboundFilter (113, InUpdate)
{
CommunicateUpdate (113, InUpdate, RC)
TranslateUpdate (113, InUpdate, effUpdate RC)
}

The InUpdate structure represents the information that the CommunicateUpdate function outputs, in the API of system 100 in response to update communication from system 10. The TranslateUpdate function converts that structure to an update on database 121, i.e., from the schema of database 11 to the schema of database 121. The conversion is carried out in a manner that is effectively the same as described above for conversions from the schema of database 121 to that of database 10.

The above disclosed the principles of this invention, but it should be understood that various modifications and additions can be implemented without departing from the spirit and scope of the invention, which is defined in the following claims.

The invention claimed is:

1. An arrangement comprising:
a processor;
a plurality of satellite databases communicating with said processor, each storing data; and
a materialized database, under control of said processor, that stores a union of the data stored in all of said satellite databases,
where said processor includes a queue that stores updates in a global database schema that are sent from said satellite databases to said processor, and said processor further includes a controller that retrieves said updates from said queue, sends said updates to one or more of said satellite databases in a corresponding satellite database schema, and applies said updates to said materialized database, in order to maintain consistency among said satellite databases and said materialized database;
where said materialized database also sends updates to said queue;
where said controller retrieves an update from said queue and, sequentially, applies each retrieved update to an outbound filter of each of said satellite databases and to said materialized database, where for each of said outbound filters, said materialized database is a source database and said each of said satellite databases, respectively, is a target database; and
where said controller applies said each update to said materialized database after said each update has been applied to all of said satellite databases.

2. An arrangement comprising:
a processor;
a plurality of satellite databases communicating with said processor, each storing data; and
a materialized database, under control of said processor, that stores a union of the data stored in all of said satellite databases,
where said processor includes a queue that stores updates in a global database schema that are sent from said satellite databases to said processor, and said processor further includes a controller that retrieves said updates from said queue, sends said updates to one or more of said satellite databases in a corresponding satellite database schema, and applies said updates to said materialized database, in order to maintain consistency among said satellite databases and said materialized database;
where said materialized database also sends updates to said queue;
where said controller retrieves an update from said queue and, sequentially, applies each retrieved update to an outbound filter of each of said satellite databases and to said materialized database, where for each of said outbound filters, said materialized database is a source database and said each of said satellite databases, respectively, is a target database;
where said outbound filter comprises a call to a translation module followed by a call to a communication module;

where said translation module converts an update expressed in a schema of said materialized database to an update expressed in a schema of its target database; and where said translation module employs a file of declarative statements that guide said conversion.

3. The arrangement of claim 2 where said file includes a specification section that specifies source database objects, and target database objects.

4. The arrangement of claim 3 where said file further includes in said specification section key fields used in add-type updates, key fields used in delete-type updates, and key fields used in update-type updates.

5. The arrangement of claim 2 where said file includes a specification section that specifies data validity constraints.

6. The arrangement of claim 5 where said data validity constraints relate to data distribution, or routing.

7. The arrangement of claim 2 where said file includes a specification that directs how to obtain values for objects in the target database from one or more objects in the source database.

8. The arrangement of claim 7 where said specification is comprehensive, providing alternative directions for obtaining value for an object in the target database from objects in the source database.

9. The arrangement of claim 8 where said alternative directions are presented in sequence, and value for an object in the target database is evaluated by evaluating the first directive in said sequence for which values are present to enable evaluating.

10. The arrangement of claim 8 where said directives include a string operation.

11. The arrangement of claim 8 where said directives include a pattern match operation.

12. A method executed in a system with which a controller maintains consistency among satellite databases and a materialized database, where said satellite databases store data and said materialized database stores data that represents the union of data stored in all of said satellite databases, comprising the steps of:

receiving an update request from a satellite database at the controller;

converting said update request to a global database schema;

storing said update request in a queue;

accessing from the queue the update request that is structured in a global schema;

selecting a satellite database as a target database to update;

converting said update request to a converted update request expressed in terms of a schema of said target database, that being a target schema, with the aid of a file of declarative statements that describe at least a part of said global schema and at least a part of said target schema; and communicating said converted update request by employing an application programming interface that is suitable for said target database;

returning to said step of selecting, to select another satellite database and repeat said steps of converting and communicating;

where said step of returning to said step of selecting selects said materialized database after all of said satellite databases have been selected.

13. The method of claim 12 further comprising a step, executed after said step of returning to said step of selecting selects said materialized database, of returning to said step of accessing, to access another update request from said queue.

* * * * *

UNITED STATES PATENT AND TRADEMARK OFFICE
CERTIFICATE OF CORRECTION

| | | |
|---|---|---|
| PATENT NO. | : 7,660,830 B2 | Page 1 of 1 |
| APPLICATION NO. | : 09/979197 | |
| DATED | : February 9, 2010 | |
| INVENTOR(S) | : Joann J Ordille | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2122 days.

Signed and Sealed this

Thirtieth Day of November, 2010

David J. Kappos
*Director of the United States Patent and Trademark Office*